United States Patent Office 3,057,751
Patented Oct. 9, 1962

---

3,057,751
BONDING PIGMENTS TO ALKENYL AROMATIC RESIN GRANULES
Floyd B. Nagle, Midland, Mich., assignor to The Dow Chemical Company, Midland, Mich., a corporation of Delaware
No Drawing. Filed Nov. 9, 1959, Ser. No. 851,543
7 Claims. (Cl. 117—100)

The present invention relates to a method of bonding dry blend pigments to alkenyl aromatic resins compositions and is more particularly concerned with a method of adhering dispersed dry pigments to the surfaces of solid alkenyl aromatic resin granules which comprises coating said granules with the dry pigment and a homopolymer of α-methyl styrene having an absolute viscosity of from about 50 to 1500 centipoises as determined by capillary flow at 60° C. in the Ubbelohde viscosimeter having a capillary diameter of 1.40 to 1.46 millimeters.

By an "alkenyl aromatic resin" is meant a solid polymer of one or more polymerizable alkenyl aromatic compounds. The polymeric resin comprises in chemically combined form at least 50 percent by weight of at least one alkenyl aromatic compound having the general formula:

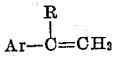

wherein Ar represents an aromatic hydrocarbon radical, or a nuclear halo-substituted aromatic hydrocarbon radical, of the benzene series, and R is hydrogen or the methyl radical. Examples of such alkenyl aromatic resins are the solid homopolymers of styrene, α-methylstyrene, ortho-methylstyrene, metamethylstyrene, para-methylstyrene, ar-ethylstyrene, ar-vinylxylene, ar-chlorostyrene, the solid copolymers of two or more of such alkenyl aromatic compounds with one another; and solid copolymers of one or more of such alkenyl aromatic compounds with minor amounts of other readily polymerizable olefinic compounds such as divinylbenzene, methylmethacrylate, acrylonitrile, butadiene, and the like.

In the production of uniformly pigmented alkenyl aromatic resin moldings it is necessary to obtain a uniform dispersion and good adhesion of pigment on the surfaces of the molding granules. It is also necessary that the pigment be bonded to the granules, rather than forming a capsule coating over the powdered blend.

With many of the common bonding agents, e.g. polyethylene glycol, low molecular weight polystyrene, and the like, the blended pigment tends to segregate, become dusty, or smear, thus producing poorly colored moldings, and molding colors which are not reproducible.

I have now found that dry blend pigments may be uniformly and securely bonded to the surfaces of alkenyl aromatic resin granules by coating said surfaces with the dry pigment and a homopolymer of α-methyl styrene having an absolute viscosity at 60° C. of from about 50 to 1500 centipoises as determined with a Ubbelhode viscosimeter having a capillary diameter of 1.40 to 1.46 millimeters. The alkenyl aromatic granules which are coated by the method of this invention are dustless and non-smearing, and the molded products are of uniform and reproducible colors.

Advantageously the α-methyl styrene homopolymers are dissolved in a solvent therefor such as Stoddard solvent, B.P. 150–205° C., Skelly solvent, B.P. 96–140° C., diethyl phthalate, dimethyl phthalate, and the like. The ratio of solvent to polymer is not critical although excessive volumes of solvent are not ordinarily used for economic reasons. A mixture of about 20 to 50 weight percent solvent and 50 to 80 weight percent α-methyl styrene homopolymer has been found efficacious.

The amount of pigment blended on the resin granules is determined by the color desired in the final molded product, and is not critical. Generally from about 0.2 to 20.0 weight percent of pigment, advantageously about 2 percent, is used.

The ratio of dry blend pigment to α-methyl styrene resin is advantageously from about 8 to 1 to about 12 to 1. Lower ratios are uneconomic and higher ratios result in inferior bonds. The amount of α-methyl styrene resin, or mixture of resins, used to bond the pigment to the resin granules is from about 0.25 to 5.0 weight percent based on the total weight of the solid polymer and pigment.

The pigment blending is advantageously carried out at room temperature, although higher or lower temperatures may be used.

A simplified flow diagram of the method is as follows:

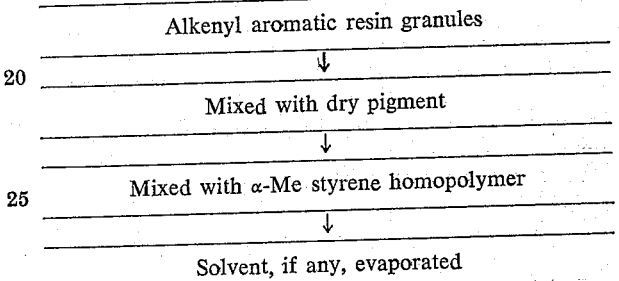

It is to be understood that in the above flow diagram the order of mixing the dry pigment and α-methyl styrene homopolymer may be reversed, or they may, if desired, be simultaneously mixed with the alkenyl aromatic resin granules.

The present invention may be illustrated by the following examples, but is not to be construed as limited thereto.

*Example I*

A copolymer of 95 weight percent styrene and 5 weight percent of a rubbery copolymer of 65 weight percent butadiene and 35 weight percent styrene was blended with stearated titanium dioxide to obtain 1816 grams of a mixture of 80 weight percent (4 parts) of the copolymer and 20 weight percent (1 part) of titanium dioxide. This mixture was then blended with a solution of 46.75 grams of poly α-methyl styrene having an absolute viscosity of 100–200 centipoises at 60° C. and 46.75 grams of Stoddard solvent, B.P. 150–205° C. for 10 minutes in a laboratory twin shell blender and dried for 1 hour at 80° C., giving a final composition of 97.57 weight percent polymer-pigment blend and 2.43 weight percent of poly α-methyl styrene bonding agent. The resulting product was non-dusting and free of lumps.

*Example II*

Another composition containing 770 grams (77 weight percent) of the above polystyrene copolymer, 200 grams (20 weight percent) of titanium dioxide pigment, and 30 grams (3 weight percent) of poly α-methyl styrene having an absolute viscosity of 700–1000 centipoises at 60° C. was prepared as in Example I. The product was dust and lump free. When this product was batch blended for 40 minutes with more polystyrene copolymer and cadmium red to give an ultimate composition of 98.8 weight percent copolymer, 1.0 weight percent titanium dioxide, 0.1 weight percent poly α-methyl styrene and 0.1 weight percent cadmium red and injection molded the resulting product was uniformly and evenly colored.

*Example III*

A concentrate containing 80 parts of a copolymer of 75 weight percent styrene and 25 weight percent acrylonitrile, and 20 parts of cadmium lithopone yellow (a mixture of 31.26 weight percent cadmium sulfide, 1.85 weight percent zinc sulfide, and 66.48 weight percent barium sulfate) which was mixed with 20 weight percent zinc stearate and then hammermilled, was prepared and found to be dusty. Two weight percent of a mixture of equal parts by weight of Stoddard solvent and poly α-methyl styrene having an absolute viscosity at 60° C. of between 700 and 1000 centipoises was then blended into the above mixture to give a dust free product containing 15.38 weight percent of the stearated cadmium lithopone yellow. A quantity of 130 grams of this concentrate was extrusion mixed with 870 grams of a copolymer of 75 weight percent styrene and 25 weight percent acrylonitrile in a 2 inch single screw laboratory extruder at 200° C. The polymer strand was cooled, pelleted, and compression molded, giving products having excellent dispersion of the pigment.

In a manner similar to that of the above Examples other solvents such as kerosene, B.P. 175–270° C., Skelly solvent, B.P. 96–140° C., diethyl phthalate, dimethyl phthalate and the like have been used with similar results. Master blends of titanium dioxide with chromium oxide, carbon black, cadmium sulfide, phthalocyanine green and cadmium red have been bonded to alkenyl aromatic resin granules with equal success.

Various modifications may be made in the present invention without departing from the spirit or scope thereof and it is understood that I limit myself only as defined in the appended claims.

I claim:

1. A method of adhering dispersed dry pigments to the surfaces of solid alkenyl aromatic resin granules which comprises coating said granules with the dry pigment and a homopolymer of α-methyl styrene having an absolute viscosity at 60° C. of from about 50 to 1500 centipoises.

2. The method of claim 1 wherein the pigment is titanium dioxide and the homopolymer of α-methyl styrene has an absolute viscosity of from about 100–200 centipoises at 60° C.

3. The method of claim 1 wherein the homopolymer of α-methylstyrene is dissolved in a solvent of the group consisting of Stoddard solvent, Skelly solvent, dialkyl phthalates, kerosene and mixtures thereof.

4. The method of claim 3 wherein the homopolymer of α-methyl styrene has an absolute viscosity of about 700 to 1000 centipoises at 60° C.

5. The method of claim 4, wherein about 20 parts by weight of titanium dioxide are blended onto a copolymer of 95 weight percent styrene and 5 weight percent of a rubbery copolymer of 65 weight percent butadiene and 35 weight percent styrene with about 3 parts by weight of poly α-methyl styrene.

6. The method of claim 4 wherein the alkenyl aromatic resin is a copolymer of styrene and acrylonitrile.

7. The method of claim 6 wherein about one part of titanium dioxide is blended onto about 4 parts of a copolymer of 95 weight percent styrene and 5 weight percent of a rubbery copolymer of 65 weight percent butadiene and 35 weight percent styrene with about 2.5 weight percent of poly α-methyl styrene.

UNITED STATES PATENTS

References Cited in the file of this patent

| | | |
|---|---|---|
| 2,489,226 | Morris et al. | Nov. 22, 1949 |
| 2,540,146 | Stober | Feb. 6, 1951 |
| 2,681,898 | Daly | June 22, 1954 |
| 2,698,313 | Daly | Dec. 28, 1954 |
| 2,945,828 | Henning | July 19, 1960 |
| 2,955,958 | Brown | Oct. 11, 1960 |
| 2,986,547 | Jefts et al. | May 30, 1961 |

FOREIGN PATENTS

| | | |
|---|---|---|
| 167,201 | Australia | Mar. 8, 1956 |